(12) United States Patent
Nordhagen

(10) Patent No.: US 10,528,631 B1
(45) Date of Patent: Jan. 7, 2020

(54) MEDIA DATA PRESENTED WITH TIME-BASED METADATA

(71) Applicant: Sony Interactive Entertainment Inc., Tokyo (JP)

(72) Inventor: Johnnemann Winthrop Nordhagen, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 988 days.

(21) Appl. No.: 14/333,496

(22) Filed: Jul. 16, 2014

Related U.S. Application Data

(63) Continuation of application No. 11/844,155, filed on Aug. 23, 2007, now Pat. No. 8,887,048.

(51) Int. Cl.
*G06F 3/00* (2006.01)
*G06F 16/9535* (2019.01)
*G06F 16/904* (2019.01)

(52) U.S. Cl.
CPC ........ *G06F 16/9535* (2019.01); *G06F 16/904* (2019.01)

(58) Field of Classification Search
CPC .................. G06F 17/30867; G06F 17/30994
See application file for complete search history.

(56) References Cited

U.S. PATENT DOCUMENTS

| | | | | |
|---|---|---|---|---|
| 2006/0282776 A1* | 12/2006 | Farmer | .................. | G11B 27/34 715/719 |
| 2007/0016865 A1* | 1/2007 | Johnson | ............ | G06F 17/30772 715/716 |
| 2008/0065701 A1* | 3/2008 | Lindstrom | ........ | G06F 17/30569 |
| 2008/0115083 A1* | 5/2008 | Finkelstein | ............. | G06F 17/30 715/805 |
| 2009/0013252 A1* | 1/2009 | DeWitt | ................ | G11B 27/034 715/716 |
| 2009/0158155 A1* | 6/2009 | Quinn | ............... | G06F 17/30743 715/716 |

* cited by examiner

*Primary Examiner* — Anil N Kumar
(74) *Attorney, Agent, or Firm* — Penilla IP, APC

(57) ABSTRACT

Methods and systems for generating and presenting comments during presentation of a media file are provided. The method includes receiving comments for a media file available on a website. The media file is defined by a video. The comments are received from members of a community of users and are associated with the media file. A request for accessing the media file is received. In response to the request, members of the community of users associated with a user initiating the request are identified. The requested media file is presented such that comments associated with the media file are displayed. The comments are filtered to include comments from members of the community associated with the user.

15 Claims, 9 Drawing Sheets

MEDIA DATA PRESENTED WITH TIME-BASED METADATA

CLAIM OF PRIORITY

This application is a continuation application of co-pending U.S. patent application Ser. No. 11/844,155, entitled "Media Data Presented With Time-Based Metadata", filed on Aug. 23, 2007, which is herein incorporated by reference in its entirety.

FIELD OF THE INVENTION

The present invention relates generally to the rendering of one or more media files, and more specifically to providing supplemental time-based metadata during the rendering of the one or more media files.

BACKGROUND

When a media file is played on a computer or an electronic device, there typically is metadata associated with the media file. Generally, the metadata associated with a media file is descriptive of the file's data as a whole. For audio media files, such as songs, the metadata may include the artist's name, information about the artist, the album name, the track name, a track number, etc. With respect to video files, the metadata may include actor names, directors, producers, movie trivia on particular scenes/actors/producer/directors, etc. The metadata information is typically integrated within the media file.

When the media file is played, the metadata may be accessed by or rendered through the media player. Currently, the metadata that is available with the media file is static in nature and provides only a single definition regarding the contents in the media file, as the metadata is generally provided by the content provider before dissemination to the public. The metadata is also not dynamically presented during the playing of the media file, but can be accessed before or after play. In some cases, the metadata provided with the media file may include sub-title tracks as well as accompanying video. This metadata is also predefined.

It is in this context that embodiments of the invention arise.

SUMMARY

The present invention addresses the needs by providing methods and systems that enable integration of time-based metadata with content media files. The time-based metadata, such as comments, etc., can be provided by an originator of the media file or defined by one or more users, and includes tagged timestamps corresponding to the contents of the media file. A plurality of tags associated with the time-based metadata is defined in the media file. When the contents of the media file are rendered, in response to a request for accessing the media file, members of a community of users associated with a user initiating the request, is identified and the media file is presented such that any metadata associated with the media file are displayed while the media file is rendered. The metadata associated with the media file are filtered to include metadata provided by members of the community that are associated with the user.

In one embodiment, a method is provided. The method includes receiving comments for a media file available on a website. The website includes a plurality of media files with each media file defined by a video. The comments are received from members of a community of users and are associated with the media file to enable accessing the comments during subsequent access and rendering of the media file. A request for accessing the media file is received. In response to the request, members of the community of users associated with a user initiating the request are identified. The media file is presented such that any comments associated with the media file are displayed while the media file is rendered. The comments associated with the media file are filtered to include comments from members of the community that are associated with the user.

In another embodiment, a method is disclosed. The method includes receiving a request for accessing a media file on a website. The website includes a plurality of media files with each media file defined by a video. The request causes the media file to be rendered. A comment is received for the media file. The comment is associated with the media file using a tag to enable accessing of the comment during subsequent accessing and rendering of the media file. Share parameters are assigned for sharing the comment with select one or more members of a community of users that are associated with the user initiating the request such that the comment is presented during the subsequent access and presentation of the media file, based on the assigned share parameters.

The present invention, thus, describes methods and apparatuses for providing a time-based metadata for the contents of the media file. The time-based metadata can be obtained from the originator of the media file or defined by a user and shared among a community of users. Further, the time-based metadata defined by the users are updateable resulting in an enhanced interactive experience for the users during the viewing of the media file. The invention thus provides the flexibility in allowing both content-provider-defined and user-defined metadata for the media that enables sharing of the metadata with other users in real-time.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Figure 1:
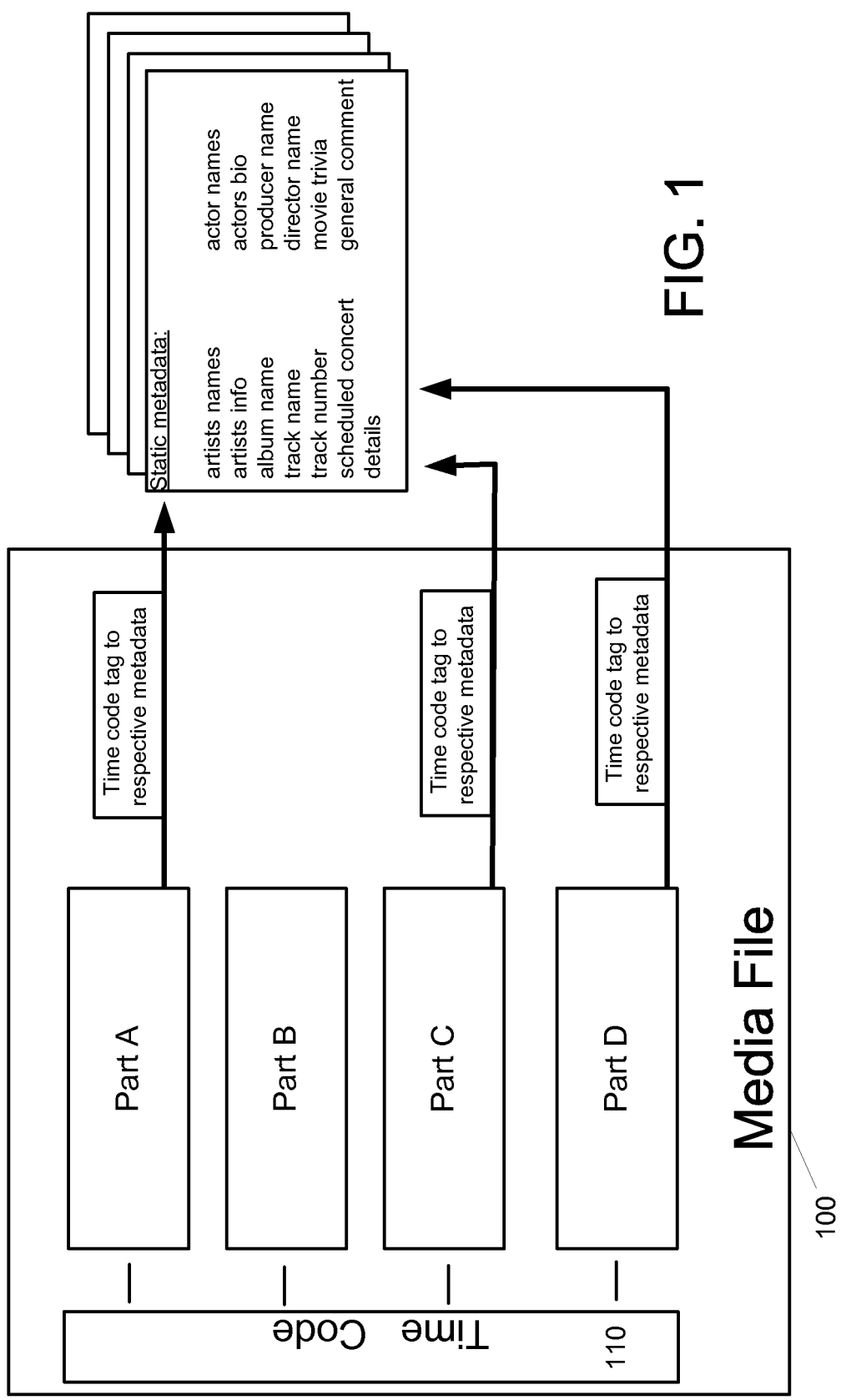
FIG. 1 illustrates a media file with a plurality of tags provided by a content provider, in accordance with one embodiment of the invention.

An invention is disclosed for integrating time-based metadata to a media file that allows for an enhanced user experience when viewing a media file. The embodiments allow a user to create and define time-based metadata and relate it to particular content of the media file. The time-based metadata is tagged with timestamps and defined as tags, correlated and linked to the content of the media file. In addition to the timestamps, the time-based metadata may be tagged with other information, such as type, category, user identification, etc. Such information may be used to define and filter user preferences for rendering the metadata. When the media file is rendered on a media player, the corresponding tags are activated. The tags, in turn, identify and render the appropriate time-based metadata that was made to be associated with the content of the media file.

As used herein, the term "media player" should be broadly construed to include any type of software, hardware, firmware, or combination of thereof, that is capable reading the media file (or portions thereof) and outputting a rendition. The rendition may be in the form of pictures, video, sounds, text, combinations of sound, text and pictures, motion pictures, television or cinematic performances, audio tracks, and the like. Example apparatuses capable of rendering a media file include, computers, game consoles, hand held computers, cable boxes, digital video recorders, cellular phones, televisions, tablet computers (wired or wireless), audio players, remote control devices, etc. The "media file" may be stored on any type of media, such as a hard drive, compact disc, tape, recording, or obtained or accessed over the Internet or cable medium (wired or wireless). When stored, the storage may be local or remote, and access can be granted, purchased or rented by subscription. The "metadata," when integrated or associated with a media file, can also be stored in various forms.

The various forms thus enable the metadata to be integrated with the media file or stored separately. The stored metadata can thus be linked to for access and reference, when rendering of the metadata is triggered. If stored separately, the metadata and the media file can reside in completely different storage locations, and linking algorithms can be defined to associate the metadata to the media file or files. Network storage systems and Internet access can enable such association, linking and dynamic presentation. The following discussion will therefore generally refer to media players and media files, but such references should be read in light of the definitions provided herein.

The time-based metadata defined by users is dynamic. As noted, the dynamic metadata may either be integrated with the media file or may be stored in a metadata repository that can be accessed through a communication network. Further, the dynamic time-based metadata is updateable and can be shared among all users or by a select group of users, providing for a rich interactive sharing tool for users during the rendering of the media file. The dynamic metadata may be generated by a current user and shared among other users or may be generated by other users and accessed by the current user. The embodiments of the invention also enable dynamic user-defined time-based metadata to be rendered along side a plurality of static metadata provided by a content provider. This results in a rich, user-friendly experience for a user during the rendering of the media file.

To facilitate an understanding of the various embodiments, a sample media file will be described first. The features of the disclosed embodiments will then be described with reference to the sample media file. The present invention is not restricted to the sample media file illustrated in FIG. 1, but may include media files nestled within media files, multiple media files of various forms/formats in a single media file or any other media file format. With this understanding in mind, it should be appreciated that the present invention can be implemented in different ways such as apparatuses and methods. It will be apparent to those skilled in the art that the present invention may be practiced without some or all of the specific details set forth herein.

FIG. 1 illustrates a sample media file 100 having a plurality of pre-defined static metadata associated with the content of the media file. In this example, the media file 100 include a plurality of parts A-D, which are played in time order and are associated with a time code 110. Selected parts can include tags to static metadata, which are respectively time coded. The static metadata may be data that is created by the producer of the media or metadata and which can be presented at the option of the user. The metadata, in one embodiment, is configured to be interactively displayed alongside or at the same time as the display of the media file 100. In this example, the time code tags are integrated with the media file 100 so that during play of the media file 100, a player is able to refer to the selected time coded tags and simultaneously render the metadata. At the option of the user, the user can decide to display or not display the metadata on a window of a screen. If the user wishes to view the meta data simultaneously during the play of the main content of the media file 100, then that option can be provided by an interactive control, icon, command, selection etc.

In one embodiment, the media file 100 may be a movie, and during the play of the movie, the user is provided with the option of displaying a sub-window to simultaneously display the metadata at the appropriate times, as triggered by tags that are time coded with the content of the movie. As different scenes come up during the movie, different content relevant to the content of the movie scene can be displayed in the metadata window. A user with a standard remote control will be allowed to flip the metadata window off, on, enlarge the window, minimize the window, etc.

In still another embodiment, the user may be provided with the option to view the metadata at a later time, such as after the movie is over. In such an embodiment, the user may be provided with a reverse window display, that shows the metadata in sequence and in a more prominent view on the display. While the user views the metadata, clips of the movie can be shown on another window, to provide the user with the correlation of why the metadata was shown.

The media file may include audio content, video content, graphic user interface content or any other content and combinations thereof, that can be captured and rendered on a media player. Likewise, static metadata associated with the content and included with the media file may include audio, video, graphics, or any forms and combinations thereof. Some static metadata for a media file with audio content may include information such as artist names, artist info, album name, track name, track number, etc., and the metadata associated with media file having video content may include actor names, actor biography, producer name, director name, movie trivia, etc. As noted above, the media player should be broadly constructed, and can be any one of a computing device, television, hand-held device such as PlayStation Portable (PSP) device, mobile phone, video camera, or any other device with ability to connect to a communication network and render a media file.

Figure 2A:
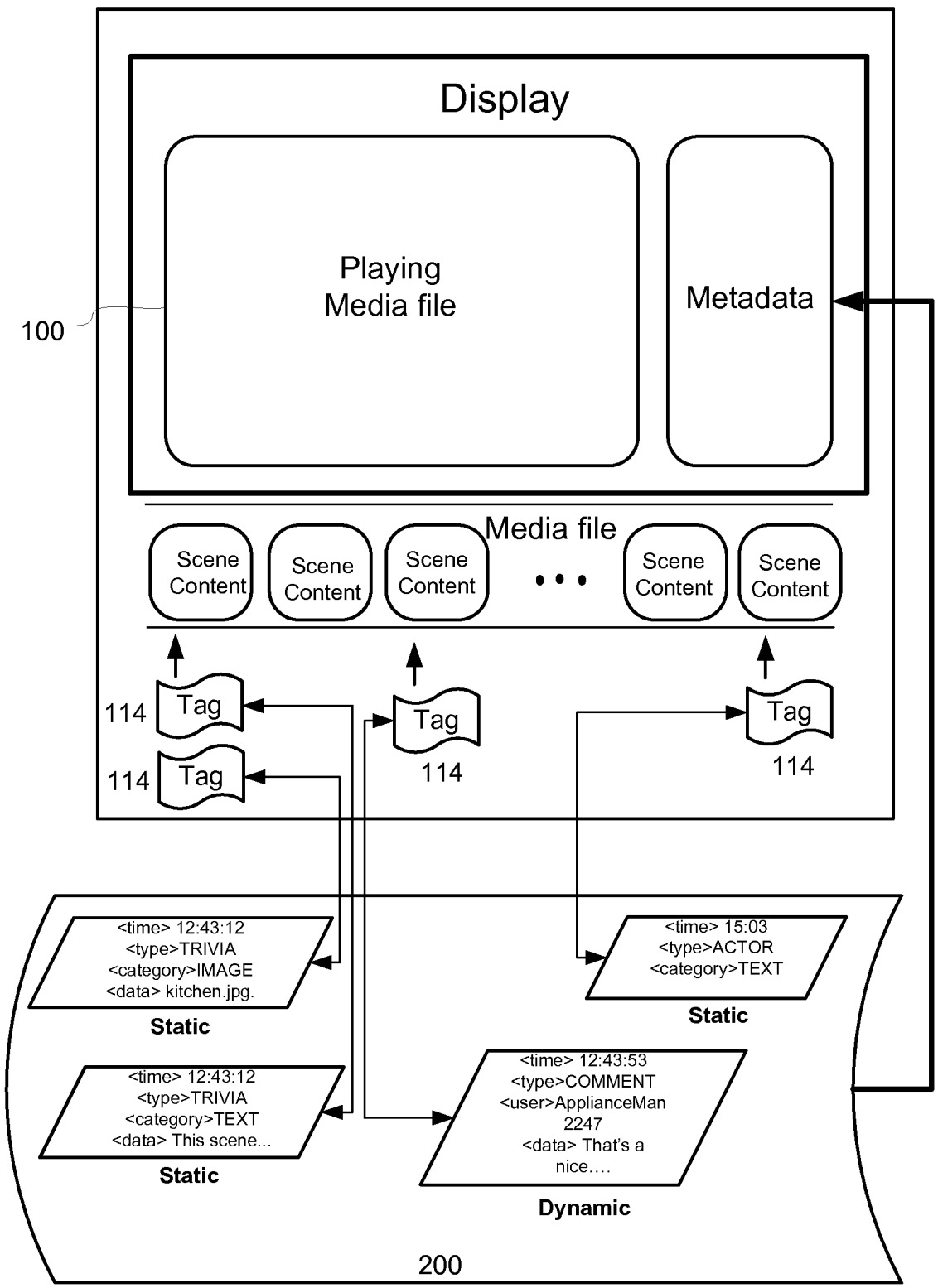
FIG. 2A illustrates a media file with static and dynamic tags, in accordance with one embodiment of the invention.

FIG. 2A illustrates a media file 100 with a plurality of tags 114 to static and dynamic metadata associated with the media file, in accordance with one embodiment of the invention. The tags 114 to static and dynamic metadata are assigned to specific content (e.g., scene content) of the media file. Static metadata is usually defined by content providers and is integrated into the media file or provided on the medium containing the media file. Dynamic metadata may be custom defined by one or more users or obtained over a network (e.g., the internet). In this example, the dynamic metadata is a comment from a user, who is providing an opinion related to the particular content in a scene. Dynamic metadata can also be automatically obtained from resources on the Internet, such as from a Wikipedia or predefined sources. Dynamic metadata may be written to storage where the media file is stored or can be stored in a metadata repository maintained at an external storage device. Some dynamic metadata is not stored, but simply accessed over the Internet when needed, e.g., by way of a link (e.g., HTTP, XML, etc.).

The tags 114 can refer to metadata that defines content of practically any format. Such formats may include text, audio clips, video clips, user comments, images, links to other data, links to the Internet, webpage content, and combinations thereof. As shown, the metadata 200, which is linked by tags to specific times of play of the media file, enable access to the content of the metadata for display or presentation on a display. The presentation may be audio-visual, but can also be limited to audio. In one embodiment, as the media file is played, the tags that are linked to specific scene content of the media file, are triggered so as to render the metadata content synchronously with the media file. Depending on whether the metadata is static or dynamic, the content of the metadata is obtained and rendered for consumption by the user. As noted above, the viewing of the content provided by the metadata is interactively controllable by the user. Such interaction can include commands to turn off the feature, turn on the feature, create new metadata and apply tags to a media file, etc.

Figure 2B:
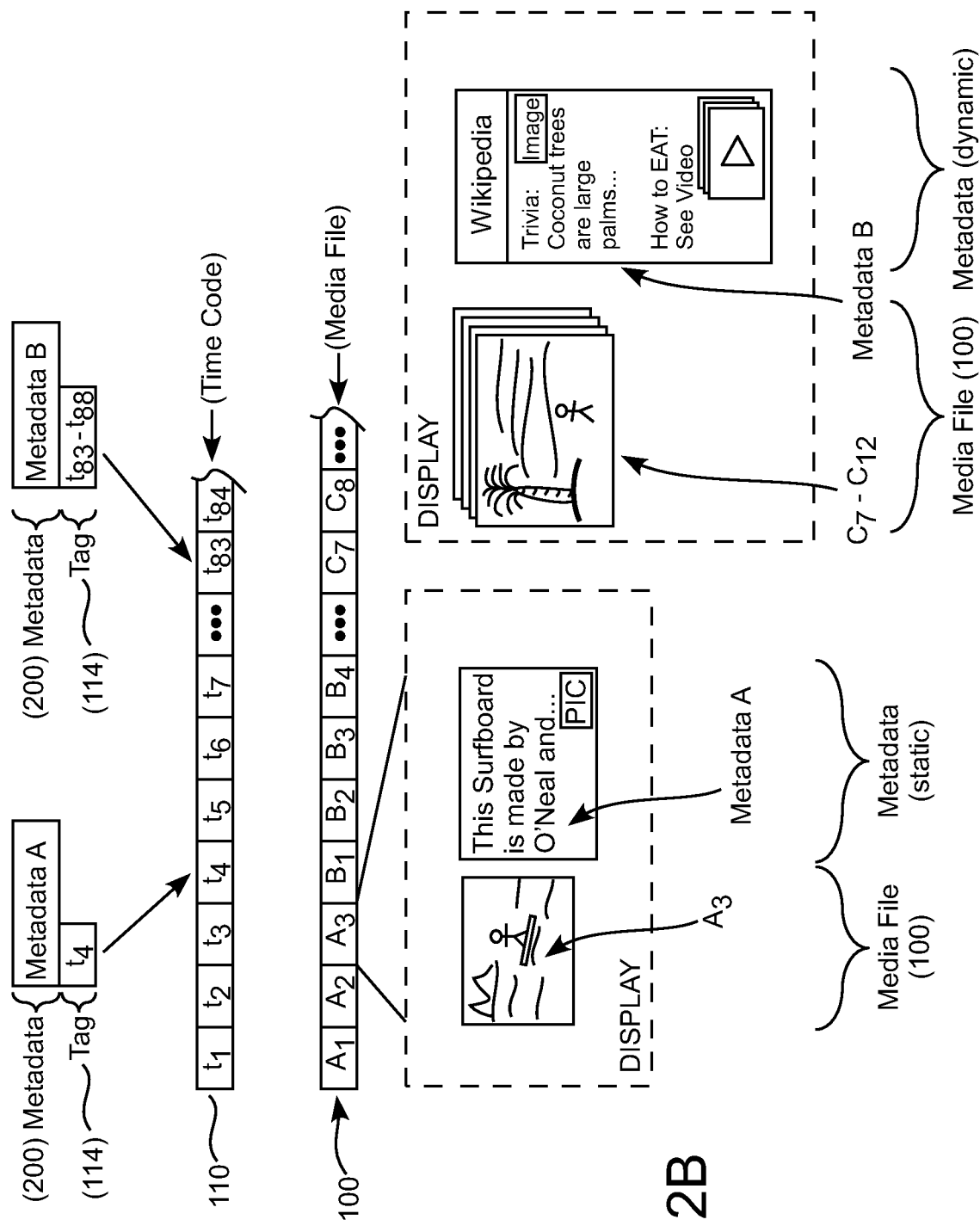
FIG. 2B illustrates an example of a media file having metadata and tag information assigned thereto, and the display of metadata related to particular content of a media file, in accordance with one embodiment of the invention.

FIG. 2B illustrates another example, where the media file 100 is shown having parts A1, A2, A3, B1, B2, B3, B4, . . . C7, C8, etc. Each of the parts of the media file 100 can be thought of as scenes, parts of scenes, actions sequences, images backgrounds, etc. The various parts of the media file 100 are time coded 110. When metadata is to be linked to the media file 100, the metadata should be tagged with time coded 110 information. The tag 114, therefore, can be a timestamp or other time indicating code. In this example, media file 100 part A3 is linked or associated with metadata A, and metadata A is provided with tag 114 that is linked to time code t4. Thus, when the media file 100 reaches time t4, the display of the media file 100 may be showing a surfer riding a surfboard. The metadata A may be information about the surfboard, such as the maker and a more detailed picture of the surfboard. A link may also be provided in the metadata A, to allow the user to view more info, seek a commercial transaction to purchase, etc.

Thus, in addition to be providing information, the metadata A can provide a way to advertise and promote sales of products shown in the scene of the media file 100. In still another example, the media file 100 can reach the rendering of C7, which will occur at time t83. Tag 114 associated with metadata B, would thus trigger, to display Wikipedia information, pictures, images, and allow for rendering of additional video (from Wikipedia or other sources). The metadata B, is shown to be associated with times t83-t88, signaling that the metadata will only be displayed during these times. Other metadata, if so liked by tags to the media file 100, can thus play or be rendered.

Figure 3:
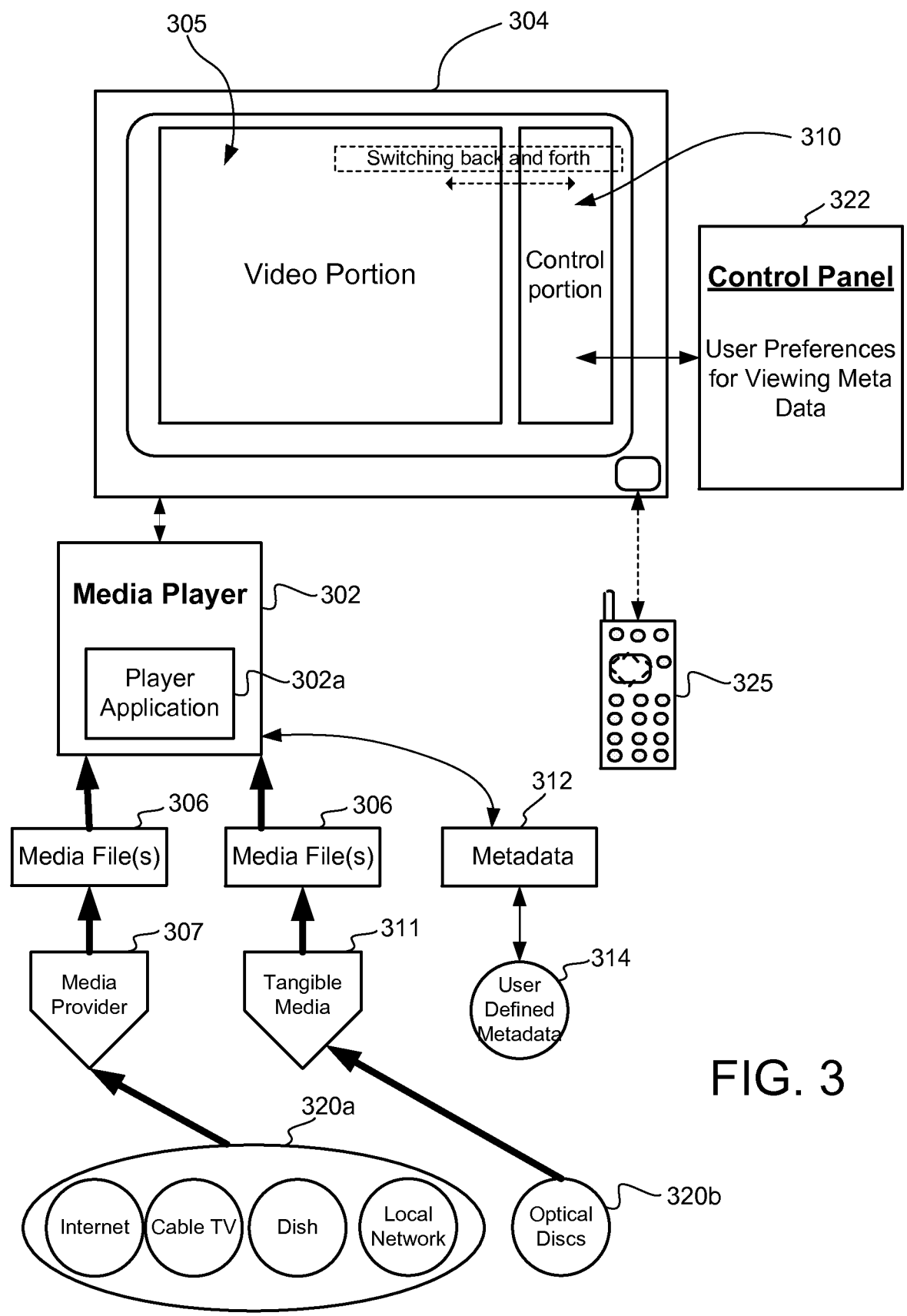
FIG. 3 illustrates a media player, a display of a video portion and control portion, and sources for obtaining the metadata, in accordance with one embodiment of the invention.

FIG. 3 illustrates a media player 302 for rendering content of a media file or files. A display device 304 is shown coupled to the media player 302. Broadly speaking, the display device 304 can be a screen, a cathode ray tube (CRT) display device, a liquid crystal display (LCD) device, a plasma display device, a surface-conduction electron-emitter display (SED), or any other display screens/media that is communicatively connected to a media player 302 and is capable of rendering the media file or files having dynamic user-defined metadata.

The system of FIG. 3, however, can take on may forms, such as a computer with associated screens, portable devices with display screens, and the like. The media player 302 is shown accepting media files 306 from various sources. One source can be from a media provider 307. The media provider 307 may be receiving information from content sources 320a. The content sources can include, for example, the internet, cable TV, dish networks, local networks, and the like. The media files 306 can take on many forms, such as packets of data, segments of data, streaming data (from the Internet or a cable provider (digital or analog)), static data, dynamically changing data, pushed data, sourced data, etc. In another embodiment, the media files 306 can be obtained from a tangible media source 311. The tangible media source 311 can obtain data from optical discs 320b and other forms of media that can be tangible obtained and communicated or played by the media player 302 (e.g., memory sticks, drives, etc.).

In one embodiment, user-defined metadata includes timestamps to enable correlation with the runtime of the media file. When a media player 302 renders a media file on the associated rendering device, the media player 302 correlates the runtime of the media file with the timestamp of the metadata and also enables rendering of the metadata. In one embodiment, a player application 302a executing on the media player 302 divides the output on the screen of the display device 304 into a video portion 305 and one or more control portions 310. The player application 302a renders the contents of the media file 306 in the video portion 305 and the metadata associated with the contents of the media file 306 in the control portion(s) 310.

The proportion (e.g., size) of the video portion 305 to the control portion(s) 310 may depend on the content of the media file being rendered in the video portion 305 and/or the type of metadata associated with the contents of the media file. In one embodiment, the control portion(s) 310 may be super-imposed on the video portion 305. Sizing can also be controlled by the user, to fit the sizing desired. Thus, if the user wishes to see more metadata in the control portion 310, then that screen element/window can be enlarged (or reduced).

The player application 302a may provide a control panel 322 window to configure the control portion 310 at initialization, loading, start of a session, or during the rendering of a media file 306, to enable a user to define criteria or preferences for rendering the media file and the associated metadata (static and user defined dynamic). The control panel 322 may provide options and controls to define a user's viewing preference, so that appropriate contents of the media files 306 and metadata 312 are rendered in the respective portions accordingly. A remote control 325 may be used to control the options and controls available at the control panel 322 and to control the content of the metadata to be rendered. Additionally, the control panel 322 may include options to define new user-defined metadata 312 or to update existing user-defined metadata associated with the contents of the media file(s) 306. The newly defined metadata or the updated metadata may be stored within the media file(s) 306 themselves or may be stored in a metadata repository 314 and linked to the media file 306. Access to the user defined metadata 314 storage can be over a network, and the like.

In one embodiment, the metadata defined and/or updated through the control panel 322 may be shared among a select group of users or a particular community of users so as to provide a rich interactive media viewing experience for the users. For instance, one user viewing a particular media file or files can add dynamic metadata that can then be viewed by other users, commented on, etc., to enable chatting or additional communication intercourse. User access and user identifiers may be assigned, so as to provide the groups with group custom tailored metadata. The users may be provided with access based on joining a service, or community. Additionally, the defined metadata may be updated by third party users or administrators that could obtain access to the metadata 312. The viewing of the metadata 312 may be controlled by providing options for a user at the control panel 322, which defines where to display the metadata 312, how long to display, format of displaying the metadata, etc.

Figure 4:
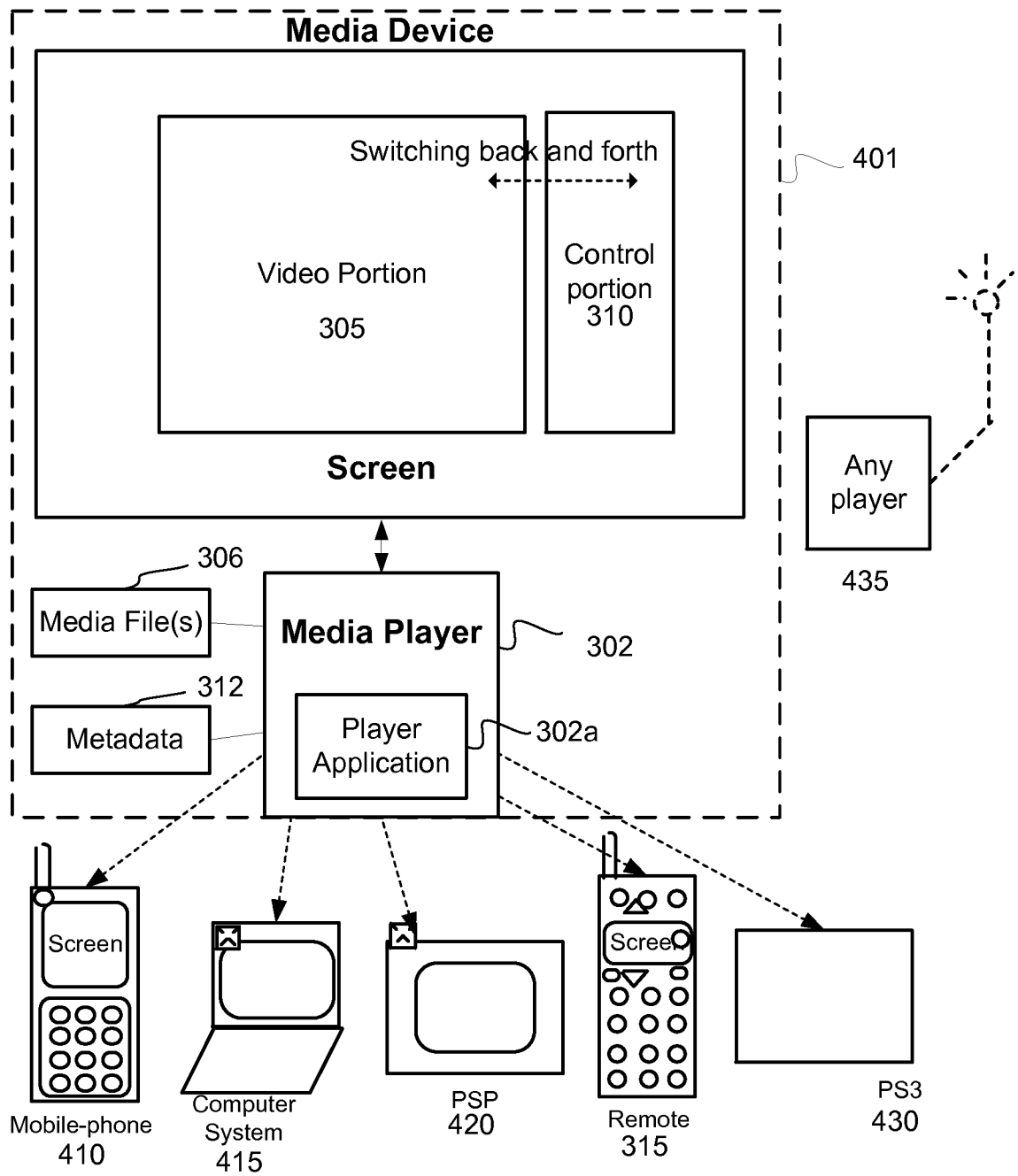
FIG. 4 illustrates a media player and a plurality of ancillary devices synchronized to the media player, in accordance with one embodiment of the invention.

FIG. 4 illustrates an embodiment where a media device 401 may include a screen and a media player 302. For instance, the device may be a computing device having a screen (or connected to a screen) and hardware/software for executing instructions for rendering media files 306 and metadata 312, which may be held in storage or obtained from the internet and temporarily stored in storage (e.g., cache, drives, memory sticks, cards, etc.). An example of the media device 401 may be a game console connected to a screen, e.g., such as the PS2™ or PS3™ from Sony Computer Entertainment Inc., or the like. In addition to the media player 302 rendering the media file(s) 306 and associated metadata 312, the media player 302 may include control options to forward the media file(s) to a plurality of ancillary devices. The ancillary devices may include electronic or computing devices, such as a mobile phone 410, computer system 415, PSP device 420, remote device 315, Play Station 3 (PS3) device 430, or any other ancillary device 435 that is configured to interact with the media player 302, to request, retrieve/receive and render the media file and the associated metadata.

In this embodiment, the ancillary devices may be configured with network interface (NICs) circuitry or software to enable interaction with the media player 302, to receive the media file(s) from the media player 302. In another embodiment, the media file may be maintained in a remote database or a remote storage device, and the ancillary device can receive a link to the media file(s) from the media player 302. Additionally, the ancillary devices can be configured to request, retrieve, and/or store the associated metadata 312 from or to the media player 302, or from or to a metadata repository maintained in a remote storage device. The ancillary devices themselves may have their own media player 302 and media application 302a, to enable rendering of the media files and also enable the users of the ancillary devices to view, generate and define new metadata when viewing the content of the media files.

In one embodiment of the invention, the media file can be pushed by the media player to an ancillary device for rendering. The media player, in this embodiment, may access the dynamic metadata associated with the media file from a remote storage device, bundle and forward the metadata to the ancillary device along with the media file. In another embodiment, only the media file is pushed to the ancillary device by the media player and any dynamic metadata associated with the media file remains in a metadata repository maintained on a remote storage device. In this embodiment, the ancillary device accesses the dynamic metadata from the metadata repository through a network communication interface. In another embodiment, the ancillary device requests and receives the media file from the media player.

In this embodiment, any dynamic metadata may or may not be part of the media file. The ancillary device will render the dynamic metadata if the dynamic metadata is available with the media file or retrieve the dynamic metadata from a metadata repository maintained on a remote storage device where the dynamic metadata associated with the media file is stored, and render the dynamic metadata at appropriate times during the rendering of the media file based on the timestamp associated with the dynamic metadata.

In one embodiment, the ancillary devices can be synchronized with the media player 302 such that the media files are rendered on the media player 306 are simultaneously rendered on the ancillary devices. The ancillary devices can be designed with controls on the ancillary device to control the rendering of the media file and the metadata associated with the media file. In one embodiment, the controls in the ancillary devices are synchronized with the controls in the media player. The controls in the ancillary devices are also used to create and/or update metadata associated with the media file being rendered on the media player.

Figure 5:
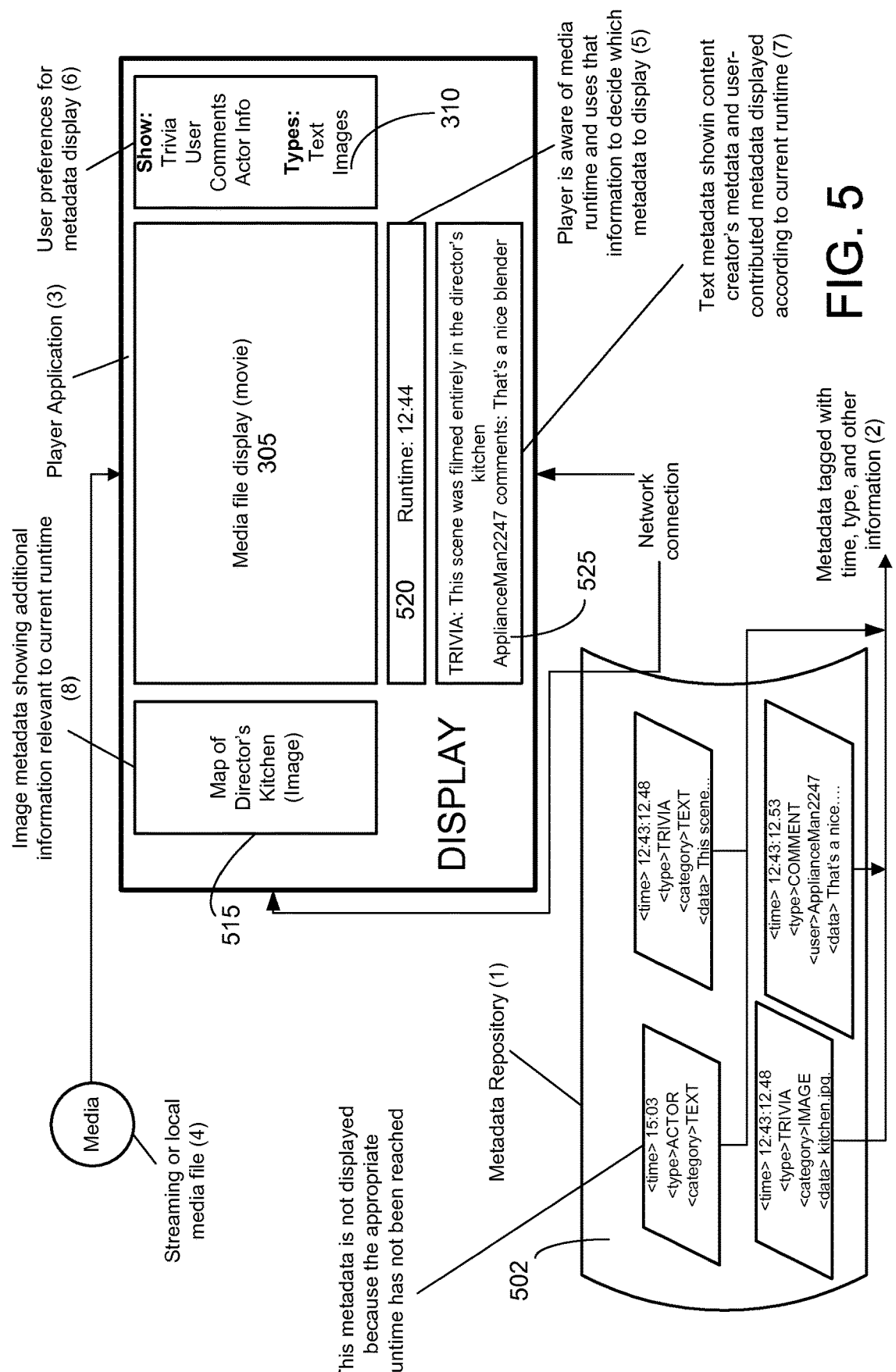
FIG. 5 illustrates an overview of the various components involved in rendering metadata with the media file, in accordance with one embodiment of the invention.

FIG. 5 illustrates the interaction between various components involved in rendering a media file, in one embodiment of the invention. A metadata repository 502 is used for storing user-defined dynamic metadata. The metadata repository 502 may also include static metadata and may be integrated within a media file or may be maintained on a remote database and accessed through the media file by other users, e.g., through a communication network. The dynamic metadata can be defined by one or more users or content providers and include timestamps correlating the metadata with the content of the media file. The metadata with timestamps is incorporated into a media file in the form of tags. A tag can be a marker, digital code, numeric code, hash value or alphanumeric value. The location of the tags in the media file correspond with the runtime of the appropriate contents of the media file, so as to enable appropriate playback of the metadata during the rendering of the media file on a media player.

In one embodiment, tags are dynamically associated with original media, but the tags are not actually embedded in the media itself. Thus, the original media file would remain unchanged, and the metadata would be stored separately. The stored metadata can be remotely stored on a network, and during play of the media by the media player, the media player can reach out to local storage, a local network, or the Internet to obtain the relevant metadata that was tagged to be rendered during a point or points in time during the play of the original media. As such, metadata can be provided for already existing DVDs, movie files, MP3s, etc. In this embodiment, it is the player's responsibility to correlate the playtime of the media (a quality inherent in the media) with the timestamps associated with each piece of media. Thus, the media file would not need any alteration in order to display the metadata.

The media player includes a player application that is used in receiving and rendering the media file. The player application provides one or more control portions 310 and one or more video portions 305 for rendering the contents of the media file and the associated metadata. In one embodiment, a control portion 310 may include a control panel with a plurality of control options for defining user preferences in viewing the media file and the metadata associated with the media file. In one embodiment, the control options may be set prior to or during the rendering of the media file. The player application includes a communication network interface to interact with a metadata repository 502 and/or a media file repository on a remote database, to obtain the metadata and media file for rendering.

When the media file having metadata is received by the media player, the player application obtains the user preferences that define the rendering format of the media file and renders the media file. The media player further identifies the metadata associated with the contents of the media file by correlating the timestamp of the media file with the correct metadata associated with the media file, obtains and renders the metadata. If the media file includes dynamic metadata in a metadata repository, the player application retrieves the metadata from the metadata repository, and renders the time-based metadata appropriately corresponding to the contents of the media file. In this embodiment, the original media file is not modified, and it is only the original timestamp information that is read, and because the media player knows what content is present during each time frame, it is able to reach out to obtain appropriate metadata for that particular time or time segments. The metadata repository may be maintained on local storage or on a remote server and accessed through the communication network. In alternative embodiments, the original media itself may include embedded information (e.g., tags) that can trigger presentation of embedded additional metadata or obtain remote metadata.

If a plurality of metadata associated with a media file is in the metadata repository, the appropriate metadata corresponding to the runtime of the media file will be identified and rendered simultaneously during the rendering of the appropriate contents. As illustrated in FIG. 5, the media file may be a streaming media or local media file with one or more dynamic metadata associated with the contents. The streaming media file may be obtained from a media file repository located on a remote database. The player application renders the media file at the video portion 305 of a screen based on user preferences. The user preferences can be defined at the control portion 310 of the rendering device. The player application can keep track of the media runtime and may display the current runtime associated with the rendered media file in a control portion 310. In one embodiment, the media runtime is based on an internal clock associated with the media file. The player application correlates the runtime 520 of the media file with the timestamp of the metadata associated with the media file to identify the appropriate metadata for rendering in the appropriate control panels.

The metadata corresponding to the media file whose timestamp do not correlate with the runtime of the media file will not be rendered, as shown in the metadata repository of FIG. 5. The player application may provide different control panels to display different forms of metadata. For instance, an image-based metadata may be rendered on a control panel 515 while a text-based metadata may be rendered on control panel 525. Additionally, each of the control panels may render both static and dynamic metadata associated with the media file, as illustrated in control panel 525.

FIG. 5 also identifies a number of system features, in accordance with one embodiment. The features include (1) a media repository for holding the metadata, and (2) metadata tagged with time, and/or data, and/or type, and/or other identifier information. Shown in (3) is a player application, which renders the data to be displayed on a screen. In (4) is streaming or local media file data, and in (5) is an indicator to enable a user/player to be aware of the media runtime. In (6), a window for displaying and providing interactivity to user preferences for the metadata is provided. (7) provides a display region where text and or other information can be shown. The text can for predefined metadata and comments of users (in the form of dynamic metadata). In (8), another window is provided showing images, which is dynamic or static metadata, that can be displayed based on the runtime of the primary media.

Figure 6:
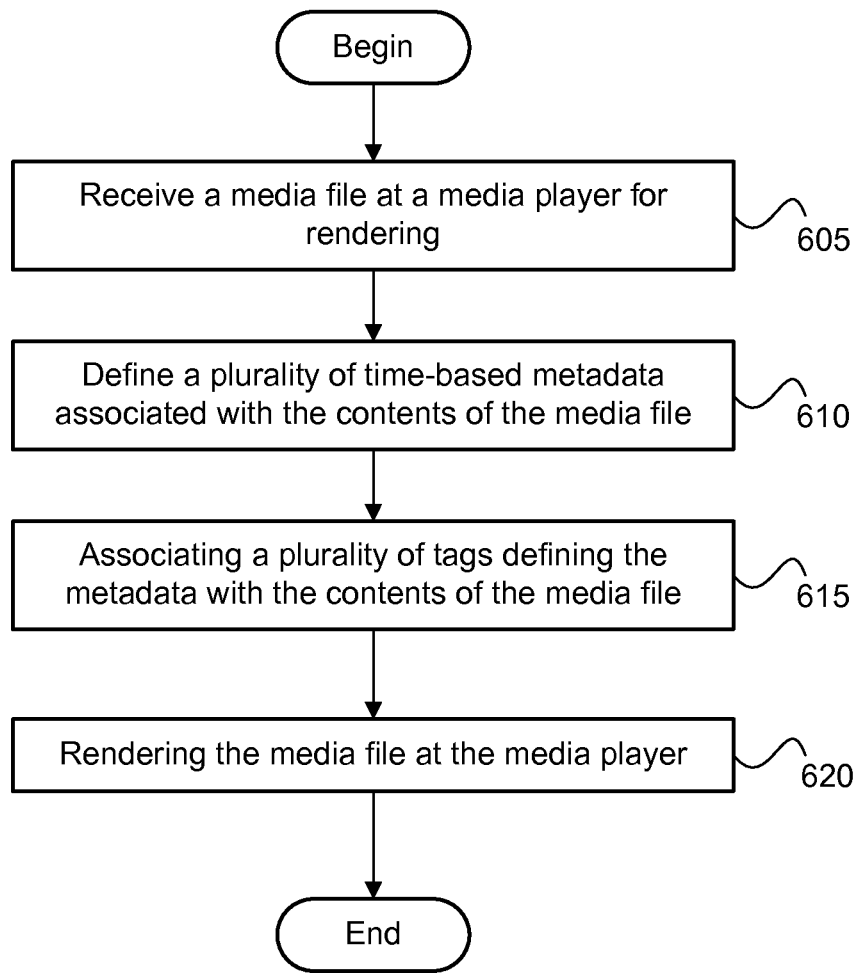
FIG. 6 illustrates the flowchart of operations involved in rendering metadata with the media file, in accordance with one embodiment of the invention.

With the above structure of the media player and media file in mind, a method for defining and rendering metadata associated with a media player will now be described in detail. The method begins with a media player receiving a media file for rendering, as shown in operation 605 of FIG. 6. The media file may have metadata associated with the contents. The metadata may be provided by a content provider and/or by a plurality of users and may be static or dynamic in nature. The metadata may be incorporated within the media file or may be stored in a metadata repository in a remote storage device. For metadata that is available in a metadata repository, the media file includes tags associating the appropriate metadata with the corresponding contents. The media file may be local media file or a streaming media file available over a communication network. In case of a streaming media file and/or metadata in a metadata repository on a remote storage device, the media player is equipped with a network communication interface to request and/or receive the media file and/or metadata over the communication network.

In operation 610, a plurality of time-based metadata is defined by a user at the media player. The media file may already have metadata (either static or both static and dynamic metadata) associated with the contents and the user defines additional dynamic time-based metadata, updates existing dynamic metadata or creates new dynamic metadata corresponding to the contents of the media file. The defined/newly created time-based metadata may be shared among a select group of users or with a whole community of users. The defined/newly created time-based metadata are tagged with timestamps to correlate with the runtime of the media file along with other information that will identify the appropriate metadata during the rendering of the media file.

To assist the media player in creating/updating dynamic metadata, the media player is equipped with a player application which enables the user to define dynamic time-based metadata. The player application provides a control panel through which a user may enter dynamic metadata to the content at appropriate locations during the rendering of the media file. In addition to adding metadata, the player application uses the control panel for entering filtering options defining user preferences that establish the rendering criteria for the media file and the associated metadata.

The player application may receive the user preferences directly via control panel from a media player or through a remote device associated with the media player prior to the rendering of the media file or during to the rendering of the media file. Further, the metadata in the metadata repository is updateable by the same user who created the original metadata or by any user having access to the metadata (e.g., an administrator). The other information with which the metadata may be tagged may be based on certain pre-defined criteria that are dependent on the contents of the metadata, such as type, category, etc. to name a few.

The time-based metadata associated with the media file may be stored in a central metadata repository which can be accessed by a whole community of users or may be stored in a secured metadata repository that is accessible by only a select group of users so that the metadata in the metadata repository may be shared among appropriate users. The metadata may include audio content, video content, graphic user interface content or any combinations thereof. In one embodiment, the time-based metadata may be stored in the metadata repository based on the tagged information so that the metadata related to the contents of the media file are organized in a logical manner. Based on user preferences, the organized metadata may be used in bundling the metadata prior to forwarding the metadata to the rendering device for rendering.

In operation 615, a plurality of tags defining the metadata are associated with the contents of the media file. The tags provide the links to the appropriate metadata in the metadata repository.

The method concludes in operation 620 where the media file is rendered on a rendering device associated with the media player. In one embodiment, in addition to rendering the media file on the media player, the player application synchronizes with an ancillary device so that the media file is rendered on the ancillary device simultaneously. The ancillary device includes a corresponding rendering device to render the contents of the media file. In this embodiment, the player application at the media player identifies and retrieves the metadata associated with the media file and forwards the metadata to the ancillary device along with the media file. During the rendering of the media file, the tag defining the metadata is activated. The activated tag renders the metadata, based on the timestamp, on the rendering device associated with the ancillary device. In another embodiment, the player application on the media player sends out control signals corresponding to tags in the media file.

A player application in the ancillary device receives the control signals, accesses the metadata repository on the remote storage device, identifies and retrieves the appropriate metadata associated with the media file and renders the appropriate metadata on the rendering device associated with the ancillary device. The player application on the ancillary device correlates the timestamp tagged to the metadata with the runtime of the media file corresponding to the control signals and identifies the appropriate metadata for rendering.

In order to provide a user-friendly and rich experience during the rendering of the media file, the player application may render the metadata associated with the media file asynchronously by establishing a transition point within the media file, in one embodiment of the invention. This would enable the user to view the media file without missing out on critical content of the media file during metadata rendering, in one embodiment of the invention. The transition point is a marker used in positioning the media file so that the media player may begin rendering the media file from the transition point. The player application establishes the transition point by identifying the location of a tag associated with the metadata, then stopping the rendering of the media file at that location, re-positioning the media file to the established transition point, accessing the metadata associated with the tag, rendering the metadata and then start rendering the media file from the transition point. In one embodiment, the transition point is established to be a few seconds prior to the runtime location of the tag so that the media file can be re-positioned.

The user, in this embodiment, will be able to refresh his/her memory with the scene that he/she was viewing prior to the rendering of the metadata. In another embodiment, the transition point may be positioned at the location of the tag so that when the user has finished viewing the time-based metadata associated with the tag, the user is able to resume the viewing of the media file. The transition point may be defined by the user before or during the rendering of the media file and may be part of the user preferences.

In another embodiment of the invention, the rendering of the metadata may be synchronous with the rendering of the media file based on the preference of the user or the community of users. This would allow the metadata to outreach in the context of the assets (contents) being rendered in the media file to provide a more in-depth perspective of the content. In this embodiment, the metadata may be rendered alongside the media file or may be superimposed over the media file within the video portion. The control portion and video portion are appropriately sized based on the contents of the media file and the associated metadata. In one embodiment, the size of the control portion and video portion is controlled by a user or community of users through user preferences.

In one embodiment, a program for rendering the metadata may be executed partially on a server connected to the internet and partially on the local computer (e.g., game console, desktop, laptop, or wireless hand held device). Still further, the execution can be entirely on a remote server or processing machine, which provides the execution results to the local display screen. In this case, the local display or system should have minimal processing capabilities to receive the data over the network (e.g., like the Internet) and render the graphical data on the screen.

Figure 7:
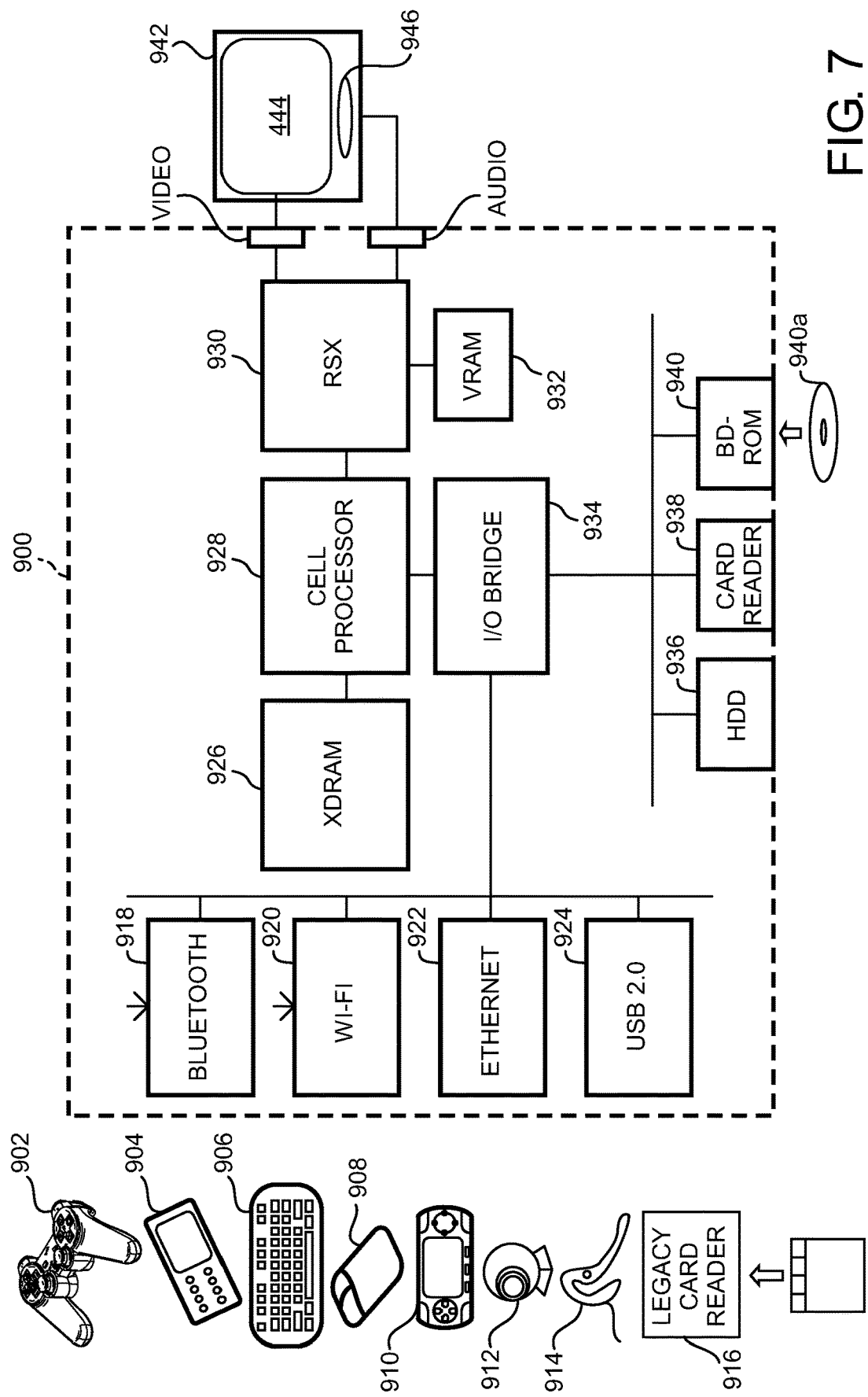
FIG. 7 schematically illustrates an example system and architecture of the Sony® Playstation 3® entertainment device, for implementing metadata correlation to media files, in accordance with one embodiment of the present invention.
Figure 8:
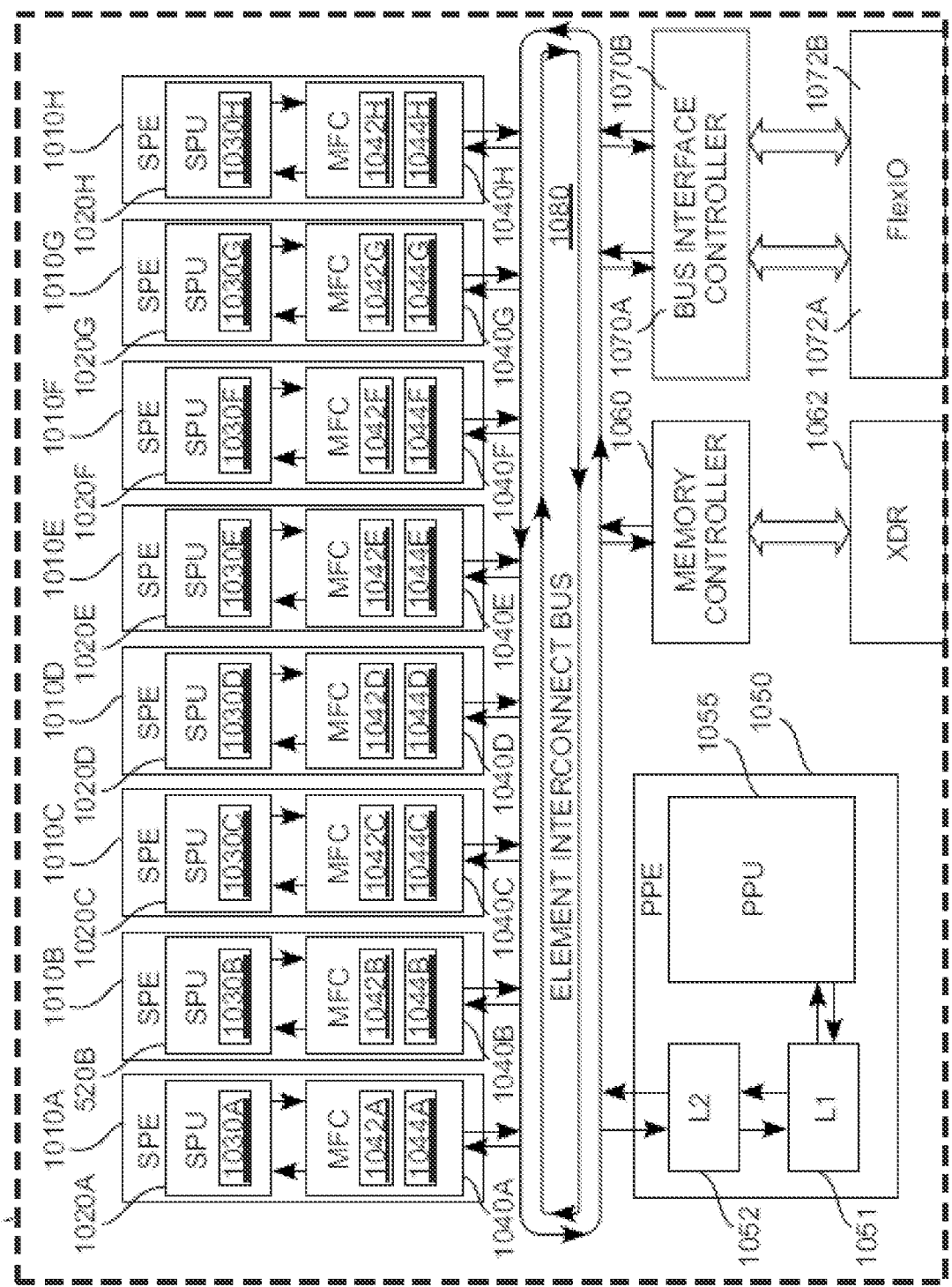
FIG. 8 is a schematic of the Cell processor in accordance with one embodiment of the present invention.

FIG. 7 schematically illustrates, for example systems, an overall architecture of the Sony® Playstation 3® entertainment device, a console having controllers for implementing an avatar control system in accordance with one embodiment of the present invention. A system unit 900 is provided, with various peripheral devices connectable to the system unit 900. The system unit 900 comprises: a Cell processor 928; a Rambus® dynamic random access memory (XDRAM) unit 926; a Reality Synthesizer graphics unit 930 with a dedicated video random access memory (VRAM) unit 932; and an I/O bridge 934. The system unit 900 also comprises a Blu Ray® Disk BD-ROM® optical disk reader 940 for reading from a disk 940*a* and a removable slot-in hard disk drive (HDD) 936, accessible through the I/O bridge 934. Optionally the system unit 900 also comprises a memory card reader 938 for reading compact flash memory cards, Memory Stick® memory cards and the like, which is similarly accessible through the I/O bridge 934.

The I/O bridge 934 also connects to six Universal Serial Bus (USB) 2.0 ports 924; a gigabit Ethernet port 922; an IEEE 802.11b/g wireless network (Wi-Fi) port 920; and a Bluetooth® wireless link port 918 capable of supporting of up to seven Bluetooth connections.

In operation the I/O bridge 934 handles all wireless, USB and Ethernet data, including data from one or more game controllers 902. For example when a user is playing a game, the I/O bridge 934 receives data from the game controller 902 via a Bluetooth link and directs it to the Cell processor 928, which updates the current state of the game accordingly.

The wireless, USB and Ethernet ports also provide connectivity for other peripheral devices in addition to game controllers 902, such as: a remote control 904; a keyboard 906; a mouse 908; a portable entertainment device 910 such as a Sony Playstation Portable® entertainment device; a video camera such as an EyeToy® video camera 912; and a microphone headset 914. Such peripheral devices may therefore in principle be connected to the system unit 900 wirelessly; for example the portable entertainment device 910 may communicate via a Wi-Fi ad-hoc connection, whilst the microphone headset 914 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 916 may be connected to the system unit via a USB port 924, enabling the reading of memory cards 948 of the kind used by the Playstation® or Playstation 2® devices.

In the present embodiment, the game controller 902 is operable to communicate wirelessly with the system unit 900 via the Bluetooth link. However, the game controller 902 can instead be connected to a USB port, thereby also providing power by which to charge the battery of the game controller 902. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 904 is also operable to communicate wirelessly with the system unit 900 via a Bluetooth link. The remote control 904 comprises controls suitable for the operation of the Blu Ray Disk BD-ROM reader 940 and for the navigation of disk content.

The Blu Ray Disk BD-ROM reader 940 is operable to read CD-ROMs compatible with the Playstation and PlayStation 2 devices, in addition to conventional pre-recorded and recordable CDs, and so-called Super Audio CDs. The reader 940 is also operable to read DVD-ROMs compatible with the Playstation 2 and PlayStation 3 devices, in addition to conventional pre-recorded and recordable DVDs. The reader 940 is further operable to read BD-ROMs compatible with the Playstation 3 device, as well as conventional pre-recorded and recordable Blu-Ray Disks.

The system unit 900 is operable to supply audio and video, either generated or decoded by the Playstation 3 device via the Reality Synthesizer graphics unit 930, through audio and video connectors to a display and sound output device 942 such as a monitor or television set having a display 944 and one or more loudspeakers 946. The audio connectors 950 may include conventional analogue and digital outputs whilst the video connectors 952 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 928. The Playstation 3 device's operating system supports Dolby® 5.1 surround sound, Dolby® Theatre Surround (DTS), and the decoding of 7.1 surround sound from Blu-Ray® disks.

In the present embodiment, the video camera 912 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 900. The camera LED indicator is arranged to illuminate in response to appropriate control data from the system unit 900, for example to signify adverse lighting conditions. Embodiments of the video camera 912 may variously connect to the system unit 900 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 900, an appropriate piece of software such as a device driver should be provided. Device driver technology is well-known and will not be described in detail here, except to say that the skilled man will be aware that a device driver or similar software interface may be required in the present embodiment described.

FIG. 10 is a schematic of the Cell processor 928 in accordance with one embodiment of the present invention. The Cell processors 928 has an architecture comprising four basic components: external input and output structures comprising a memory controller 1060 and a dual bus interface controller 1070A,B; a main processor referred to as the Power Processing Element 1050; eight co-processors referred to as Synergistic Processing Elements (SPEs) 1010A-H; and a circular data bus connecting the above components referred to as the Element Interconnect Bus 1080. The total floating point performance of the Cell processor is 218 GFLOPS, compared with the 6.2 GFLOPs of the Playstation 2 device's Emotion Engine.

The Power Processing Element (PPE) 1050 is based upon a two-way simultaneous multithreading Power 970 compliant PowerPC core (PPU) 1055 running with an internal clock of 3.2 GHz. It comprises a 512 kB level 2 (L2) cache and a 32 kB level 1 (L1) cache. The PPE 1050 is capable of eight single position operations per clock cycle, translating to 25.6 GFLOPs at 3.2 GHz. The primary role of the PPE 1050 is to act as a controller for the Synergistic Processing Elements 1010A-H, which handle most of the computational workload. In operation the PPE 1050 maintains a job queue, scheduling jobs for the Synergistic Processing Elements 1010A-H and monitoring their progress. Consequently each Synergistic Processing Element 1010A-H runs a kernel whose role is to fetch a job, execute it and synchronizes with the PPE 1050.

Each Synergistic Processing Element (SPE) 1010A-H comprises a respective Synergistic Processing Unit (SPU) 1020A-H, and a respective Memory Flow Controller (MFC) 1040A-H comprising in turn a respective Dynamic Memory Access Controller (DMAC) 1042A-H, a respective Memory Management Unit (MMU) 1044A-H and a bus interface (not shown). Each SPU 1020A-H is a RISC processor clocked at 3.2 GHz and comprising 256 kB local RAM 1030A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1020A-H does not directly access the system memory XDRAM 926; the 64-bit addresses formed by the SPU 1020A-H are passed to the MFC 1040A-H which instructs its DMA controller 1042A-H to access memory via the Element Interconnect Bus 1080 and the memory controller 1060.

The Element Interconnect Bus (EIB) 1080 is a logically circular communication bus internal to the Cell processor 928 which connects the above processor elements, namely the PPE 1050, the memory controller 1060, the dual bus interface 1070A,B and the 8 SPEs 1010A-H, totaling 12 participants. Participants can simultaneously read and write to the bus at a rate of 8 bytes per clock cycle. As noted previously, each SPE 1010A-H comprises a DMAC 1042A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1060 comprises an XDRAM interface 1062, developed by Rambus Incorporated. The memory controller interfaces with the Rambus XDRAM 926 with a theoretical peak bandwidth of 25.6 GB/s.

The dual bus interface 1070A,B comprises a Rambus FlexIO® system interface 1072A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 928 to the Reality Simulator graphics unit 930 will typically comprise display lists, being a sequence of commands to draw vertices, apply textures to polygons, specify lighting conditions, and so on.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
  receiving, by a server, comments related to content of a media file available on a website, the website having a plurality of media files with each media file defined by a video, wherein the comments are received from members of a community of users and are dynamically associated with specific portions of content of the media file using tags, the tags having identifier information of the members generating the comments and timestamps that correlate with runtime of the media file to enable presenting the comments during rendering of the media file;
  detecting, by the server, a user accessing the media file via a client, the user identified using user identifier information;
  identifying, by the server, members of the community of users that are associated with the user when the user is accessing the media file; and presenting, by the server, the content of the media file, such that any comments associated with a specific portion of the media file are displayed at a user interface of the client while the media file is rendered, wherein the comments associated with the specific portion of the media file are dynamically filtered during presentation of the content based on identifier information of the user accessing the media file and identifier information provided in the tags so as to limit inclusion of comments from members of the community that are associated with the user, wherein the comments presented are selected for sharing with only the members of the community of users in which the user is a member, wherein the method is executed by one or more processors.

2. The method of claim 1, wherein receiving comments includes receiving updates to comments that were provided for the media file by one or more members of the community, or receiving new comments, wherein the updates to a comment may be provided by a member that generated the comment or by other members of the community.

3. The method of claim 1, further includes storing select ones of the comments generated or shared by a select group of users within the community, in a secure repository so that access to the select ones of the comments is restricted to the select group of users.

4. The method of claim 3, wherein the comments are stored using time-based or content-based tags, wherein the identifier information in the tags are used to correlate and link the comments to the specific portion of the content of the media file.

5. The method of claim 4, wherein presenting media file further includes,
receiving user preference for viewing the comments; and
formatting the comments received from the members of the community for rendering, in accordance to the user preference, the formatted comments presented at appropriate times during rendering of the media file.

6. The method of claim 1, wherein the comments are rendered synchronously alongside the content of the media file.

7. The method of claim 1, wherein presenting the media file further includes rendering the comments in temporal sequence, the rendering of comments causing clips of the media file to which the comments are associated, to be rendered alongside the comments.

8. A method, comprising:
receiving, by a server, a request for accessing a media file on a website having a plurality of media files, each media file defined by a video, the request causing the media file to be rendered;
receiving, by the server, a comment related to a specific portion of content of the media file from a user initiating the request, the comment being dynamically associated with the specific portion of the media file using a tag that includes an identifier information of the user providing the comment and a timestamp that correlates with runtime of the media file to enable rendering of the comment during subsequent rendering of the specific portion of the media file; and
assigning, by the server, share parameters for sharing the comment with select one or more members of a community of users that are associated with the user initiating the request, such that the comment is presented to a user interface of a client of the one or more members of the community of users during the rendering of the specific portion of the media file, based on the assigned share parameters, the identifier information of the one or more members, and the identifier information of the user included in the tag, wherein the media file includes comments from different users and wherein presenting the comment includes dynamically filtering the comments during the rendering of the specific portion of the media file so as to limit inclusion of the comment from the members of the community of users in which the user is a member, based on the share parameters, the media file and the comment being rendered in response to request for the media file received from the one or more members of the community of users, the method executed by one or more processors.

9. The method of claim 8, wherein receiving the comment includes adding to an existing comment or generating a new comment for the media file.

10. The method of claim 8, further includes storing the comment in a secure repository so that access to the comment is restricted to the select one or more members of the community of users.

11. The method of claim 8, further includes integrating the comment with the media file.

12. The method of claim 8, wherein the tag is a time-based tag or content-based tag.

13. The method of claim 8, wherein the share parameters include the identifier information of the user providing the comment and one or more access identifiers for identifying the members of the community with whom the comment is to be shared.

14. The method of claim 1, wherein presenting the comments associated with the media file further includes,
identifying select ones of the comments for the media file generated by the members of the community that are identified for sharing with other members of the community in which the user is a member, wherein the comments generated for the media file by the members of the community are stored in a secure repository; and
retrieving the identified comments from the secure repository for bundling with content of the media file, wherein the media file with the identified comments forwarded to an ancillary device associated with the user for rendering, the ancillary device being communicatively coupled to the device.

15. The method of claim 1, wherein presenting the comments associated with the media file further includes,
identifying select ones of the comments for the media file generated by the members of the community for sharing with other members of the community, wherein the comments for the media file generated by the members of the community are stored in a secure repository; and
updating specific portions of the media file with tags for the select ones of the comments, wherein the specific portions of the media file are identified using the timestamps in the tags, the updated media file forwarded to an ancillary device associated with the user, for rendering, wherein the ancillary device includes a media player for rendering the media file and for dynamically retrieving the select ones of the comments for rendering during rendering of content for the specific portions of the media file, based on the timestamps associated with the tags for the select ones of the comments.

* * * * *